United States Patent
Vidal et al.

(10) Patent No.: US 9,865,012 B2
(45) Date of Patent: Jan. 9, 2018

(54) METHOD, MEDIUM, AND SYSTEM FOR INTELLIGENT RECEIPT SCANNING AND ANALYSIS

(71) Applicant: Accenture Global Services Limited, Dublin (IE)

(72) Inventors: Richard Vidal, Antibes (FR); Christian Souche, Cannes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 466 days.

(21) Appl. No.: 14/634,299

(22) Filed: Feb. 27, 2015

(65) Prior Publication Data

US 2016/0055568 A1     Feb. 25, 2016

(30) Foreign Application Priority Data

Aug. 22, 2014  (EP) .................................. 14306305

(51) Int. Cl.
  *G06Q 30/06*    (2012.01)
  *G06Q 30/00*    (2012.01)
  (Continued)

(52) U.S. Cl.
  CPC ..... *G06Q 30/0631* (2013.01); *G06F 17/3061* (2013.01); *G06F 17/30253* (2013.01); *G06N 99/005* (2013.01); *G06Q 30/00* (2013.01)

(58) Field of Classification Search
  CPC ................ G06Q 30/0631; G06Q 30/00; G06F 17/30253; G06F 17/3061; G06N 99/005
  See application file for complete search history.

(56) References Cited

U.S. PATENT DOCUMENTS

| 7,792,709 B1* | 9/2010 | Trandal | G06Q 30/02 705/26.1 |
| 8,484,225 B1* | 7/2013 | Datta | G06Q 30/02 707/749 |

(Continued)

OTHER PUBLICATIONS

Shen, Zhinian, and Yuri Tijerino. "Ontology-based automatic receipt accounting system." Proceedings of the the 2012 IEEE/WIC/ACM International Joint Conferences on Web Intelligence and Intelligent Agent Technology—vol. 03. IEEE Computer Society, 2012.*

(Continued)

*Primary Examiner* — Matthew E Zimmerman
(74) *Attorney, Agent, or Firm* — Mannava & Kang, P.C.

(57) ABSTRACT

Intelligent receipt scanning and analysis may include scanning a receipt that includes information related to a product. The information related to the product may be transformed to text, and extracted from the text by utilizing a machine learning process. The extracted information may be compared to known information for a plurality of known products to identify the product as a known product of the plurality of known products or an unknown product. The extracted information related to the product and known product information, from the known information, for the known product of the plurality of known products may be analyzed in response to a determination that the extracted information is similar to the known product information for the known product of the plurality of known products.

20 Claims, 6 Drawing Sheets

(51) Int. Cl.
    *G06N 99/00*         (2010.01)
    *G06F 17/30*         (2006.01)

(56)                 References Cited

U.S. PATENT DOCUMENTS

| | | | |
|---|---|---|---|
| 2003/0215137 A1* | 11/2003 | Wnek | G06K 9/00469 |
| | | | 382/181 |
| 2005/0160004 A1* | 7/2005 | Moss | G06Q 30/00 |
| | | | 705/14.35 |
| 2007/0091373 A1* | 4/2007 | Sato | G06F 17/211 |
| | | | 358/1.18 |
| 2008/0180717 A1* | 7/2008 | Hirabayashi | G06F 17/30011 |
| | | | 358/1.14 |
| 2009/0248687 A1* | 10/2009 | Su | G06F 17/30533 |
| 2012/0078682 A1* | 3/2012 | Pinsley | G06Q 30/0201 |
| | | | 705/7.29 |
| 2012/0330971 A1* | 12/2012 | Thomas | G06F 17/30663 |
| | | | 707/748 |
| 2014/0304059 A1* | 10/2014 | Wang | G06Q 30/0234 |
| | | | 705/14.34 |

OTHER PUBLICATIONS European Patent Office, "Extented European Search Report", EP Patent Application No. 14306305.5-1955, dated Feb. 12, 2015, 8 pages.

\* cited by examiner

```
┌─────────────────────────────────────────────────────┐
│   TRANSFORM INFORMATION RELATED TO A                │
│   PRODUCT FROM A SCANNED RECEIPT TO TEXT            │
│                      402                            │
└─────────────────────────────────────────────────────┘
                          ↓
┌─────────────────────────────────────────────────────┐
│ UTILIZE A MACHINE LEARNING PROCESS TO ESTIMATE A    │
│ PATTERN FOR THE SCANNED RECEIPT TO EXTRACT THE      │
│ INFORMATION RELATED TO THE PRODUCT FROM THE TEXT    │
│                      404                            │
└─────────────────────────────────────────────────────┘
                          ↓
┌─────────────────────────────────────────────────────┐
│ COMPARE THE EXTRACTED INFORMATION RELATED TO THE    │
│ PRODUCT TO KNOWN INFORMATION FOR A PLURALITY OF     │
│ KNOWN PRODUCTS TO IDENTIFY THE PRODUCT AS A KNOWN   │
│ PRODUCT OF THE PLURALITY OF KNOWN PRODUCTS OR AN    │
│ UNKNOWN PRODUCT                                     │
│                      406                            │
└─────────────────────────────────────────────────────┘
                          ↓
┌─────────────────────────────────────────────────────┐
│ IN RESPONSE TO A DETERMINATION THAT THE EXTRACTED   │
│ INFORMATION RELATED TO THE PRODUCT IS WITHIN A      │
│ SPECIFIED DISTANCE TO KNOWN PRODUCT INFORMATION,    │
│ FROM THE KNOWN INFORMATION, FOR THE KNOWN PRODUCT   │
│ OF THE PLURALITY OF KNOWN PRODUCTS, ANALYZE THE     │
│ EXTRACTED INFORMATION RELATED TO THE PRODUCT AND    │
│ THE KNOWN PRODUCT INFORMATION                       │
│                      408                            │
└─────────────────────────────────────────────────────┘
                          ↓
┌─────────────────────────────────────────────────────┐
│ IN RESPONSE TO A DETERMINATION THAT THE PRODUCT IS  │
│ AN UNKNOWN PRODUCT, STORE THE EXTRACTED             │
│ INFORMATION RELATED TO THE PRODUCT                  │
│                      410                            │
└─────────────────────────────────────────────────────┘
```

```
┌─────────────────────────────────────────────────┐
│  SCAN A RECEIPT BY GENERATING A SPECIFIED       │
│  NUMBER OF SNAPSHOTS OF THE RECEIPT AT A        │
│              SPECIFIED RATE                     │
│                    502                          │
└─────────────────────────────────────────────────┘
                        │
                        ▼
┌─────────────────────────────────────────────────┐
│  TRANSFORM THE INFORMATION RELATED TO THE       │
│  PRODUCT FROM THE SCANNED RECEIPT TO TEXT       │
│                    504                          │
└─────────────────────────────────────────────────┘
                        │
                        ▼
┌─────────────────────────────────────────────────┐
│  UTILIZE A MACHINE LEARNING PROCESS TO ESTIMATE │
│  A PATTERN FOR THE SCANNED RECEIPT TO EXTRACT   │
│  THE INFORMATION RELATED TO THE PRODUCT FROM    │
│                    THE TEXT                     │
│                      506                        │
└─────────────────────────────────────────────────┘
                        │
                        ▼
┌─────────────────────────────────────────────────┐
│  COMPARE THE EXTRACTED INFORMATION RELATED TO   │
│  THE PRODUCT TO KNOWN INFORMATION FOR A         │
│  PLURALITY OF KNOWN PRODUCTS TO IDENTIFY THE    │
│  PRODUCT AS A KNOWN PRODUCT OF THE PLURALITY    │
│  OF KNOWN PRODUCTS OR AN UNKNOWN PRODUCT        │
│                    508                          │
└─────────────────────────────────────────────────┘
```

METHOD, MEDIUM, AND SYSTEM FOR INTELLIGENT RECEIPT SCANNING AND ANALYSIS

PRIORITY

This application is a non-provisional which claims priority to European Application Serial Number 14306305.5, filed Aug. 22, 2014, and entitled "INTELLIGENT RECEIPT SCANNING AND ANALYSIS", which is incorporated by reference in its entirety.

BACKGROUND

Receipts, such as consumer receipts, typically include various types of information related to products that are purchased by a consumer (i.e., purchaser). For example, receipts typically include a code or description related to a product that is purchased, the price of the product, the location of the purchase, and other information related to the consumer, the product, and/or the place of purchase. The code and/or description related to a product may be specific to the product and/or the seller of the product.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For receipts that include various details related to a product, analysis of information related to the seller of the product, and/or the purchaser of the product is challenging due to limitations related to comprehension of the information on the receipt. For example, for receipts that typically include limited information, determining the content of the information and accuracy of any content determination can be challenging. For example, a receipt may include a code for a product and an associated price for the product. Comprehension of such a code for a product can be challenging when determining any product details related to the code. According to another example, a receipt may not include any code, but instead include a label for a product and an associated price for the product. Comprehension of such a label for a product can be challenging when determining any product details related to the label.

In order to address at least the foregoing aspects, according to examples disclosed herein, an intelligent receipt scanning and analysis system and a method for intelligent receipt scanning and analysis are disclosed herein. According to an example, the intelligent receipt scanning and analysis system may include at least one processor, and a receipt scanner that is executed by the at least one processor to scan a receipt that includes information related to a product. According to an example, the receipt scanner may be a mobile device such as a mobile phone. A scan transformer that is executed by the at least one processor may transform the information related to the product from the scanned receipt to text. For example, the scan transformer may transform the details (e.g., product code, product price, seller information, purchaser information, etc.) of the receipt into text that may be subsequently analyzed. An information extractor that is executed by the at least one processor may utilize a machine learning process to extract the information related to the product from the text. For example, the information extractor may extract the meaningful details of the information related to the product from the text. A product matcher that is executed by the at least one processor may compare the extracted information related to the product to known information for a plurality of known products to identify the product as a known product of the plurality of known products or an unknown product. Thus, the product matcher may determine whether the product is a product that includes existing information (e.g., a known product of the plurality of known products) or is an unknown product (e.g., a new product). A product analyzer that is executed by the at least one processor may analyze the extracted information related to the product and known product information, from the known information, for the known product of the plurality of known products in response to a determination that the extracted information related to the product is similar to the known product information for the known product of the plurality of known products, and/or store the extracted information related to the product in response to a determination that the product is an unknown product. For example, the product analyzer may utilize various similarity and distance criteria to evaluate the extracted information and the known product information. A report generator that is executed by the at least one processor may generate a report based on the analysis of the extracted information related to the product and the known product information for the known product of the plurality of known products. For example, the reports may include various information such as identification of purchasers of the product, identification of potential purchasers of the product, and/or identification of a lowest price of the product.

The intelligent receipt scanning and analysis system and the method for intelligent receipt scanning and analysis disclosed herein provide a technical solution to technical problems related, for example, to comprehension and analysis of information on a receipt related to purchase of a product. The system and method disclosed herein provide the technical solution of a machine learning process based information extractor to extract information related to a product from text that is determined from information on a receipt. The machine learning process may be based on estimation of a pattern for the receipt, and/or estimation of a pattern for a product line related to the product. The machine learning process based information extractor may provide for improvement in accuracy of extraction of information from a receipt, and further reduce resource utilization by reducing inaccuracies related to assessment of receipt information. The system and method disclosed herein further provide the technical solution of scanning the receipt by generating a plurality of snapshots of the receipt at a specified (predetermined or predeterminable) constant rate, single snapshot based scanning, and/or video based scanning. The system and method disclosed herein further provide the technical solution of comparing the extracted information related to the product to known information for a plurality of known products to identify the product as a known product of the plurality of known products or an unknown product by comparing a description of the product with product labels of the plurality of known products, and in response to a determination that the description of the product is within a specified (predetermined or predeterminable) distance to a product label of the product labels of the plurality of known products, and a price of the product is within a specified (predetermined or predeterminable) high price threshold and a specified (predetermined or predeterminable) low price threshold compared to a price of one of the known products, identifying the product as the one of the known products. Thus, the system and method disclosed herein further provide the technical solution of utilizing various similarity and distance criteria to evaluate the extracted information and the known product information.

Figure 1:
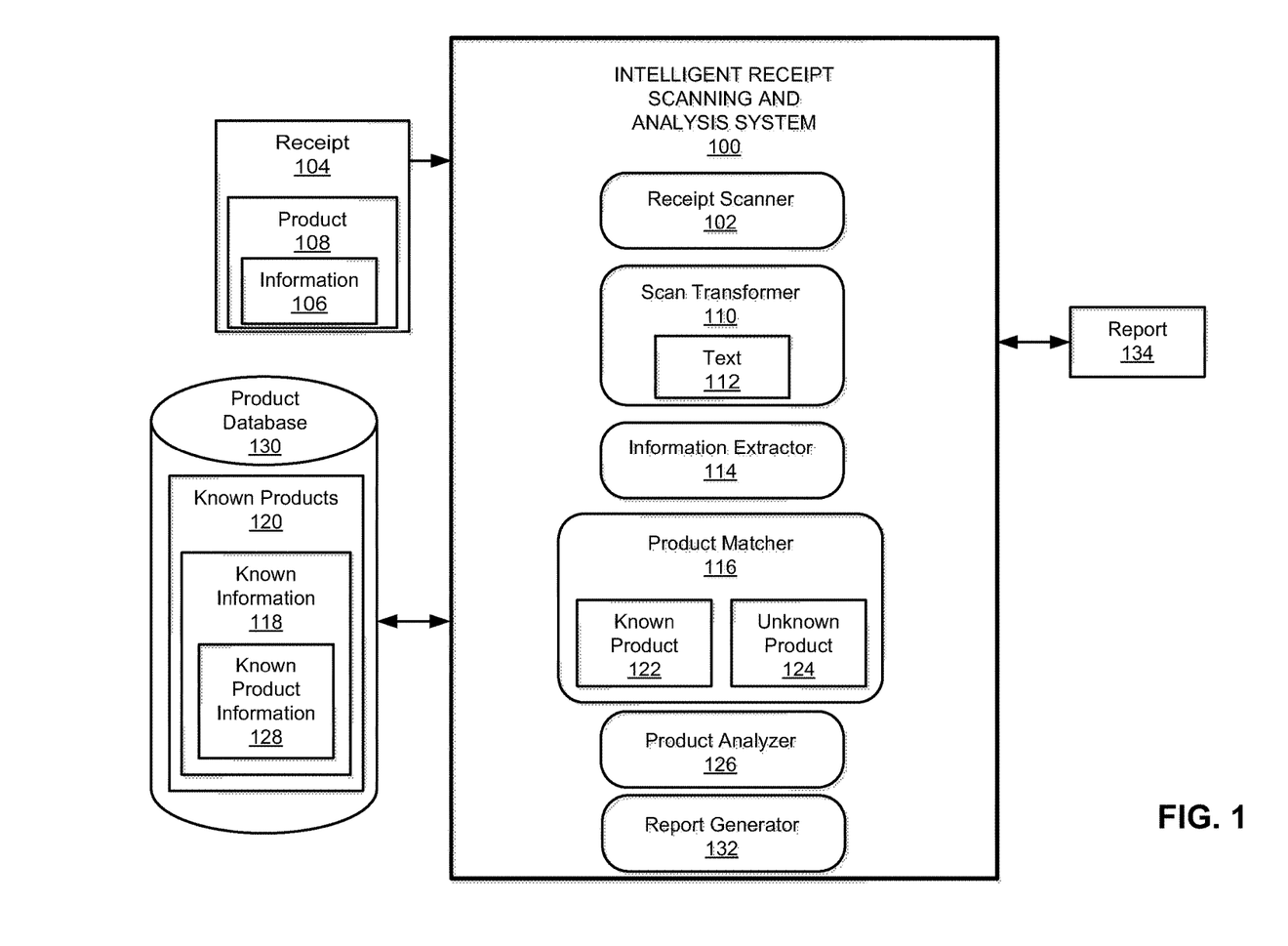
FIG. 1 illustrates a detailed architecture of an intelligent receipt scanning and analysis system, according to an example of the present disclosure.

FIG. 1 illustrates a detailed architecture of an intelligent receipt scanning and analysis system 100, according to an example of the present disclosure. The system 100 may include a receipt scanner 102 to scan a receipt 104. The receipt 104 may include information 106 related to purchase of a product 108 and/or a service (hereinafter generally referred to as product 108). The product 108 may include a plurality of products 108. The product 108 may include consumer goods that are purchased at a retailer, online, or otherwise.

A scan transformer 110 is to transform the information 106 related to the product 108 from the scanned receipt 104 to text 112. The information 106 may include product description, price information, product codes, product label information, and generally, any information related to the product 108.

An information extractor 114 is to utilize a machine learning process to extract the information 106 related to the product 108 from the text 112.

A product matcher 116 is to compare the extracted information 106 related to the product 108 to known information 118 for a plurality of known products 120 to identify the product 108 as a known product 122 of the plurality of known products 120 or an unknown product 124. The known products 120 may include products for which information such as product description, price information, product codes, product label information, and other types of information is known.

A product analyzer 126 is to analyze the extracted information 106 related to the product 108 and known product information 128, from the known information 118, for the known product 122 of the plurality of known products 120 in response to a determination that the extracted information 106 related to the product 108 is similar to the known product information 128 for the known product 122 of the plurality of known products 120. Further, the product analyzer 126 may store the extracted information 106 related to the product 108 in response to a determination that the product 108 is an unknown product 124. For example, the product analyzer 126 may store the extracted information 106 related to the product 108 in a product database 130. The product analyzer 126 may similarly store any new information from the extracted information 106 related to the product 108 in the product database 130.

A report generator 132 is to generate a report 134 based on the analysis of the extracted information 106 related to the product 108 and the known product information 128 for the known product 122 of the plurality of known products 120.

As described herein, the elements of the intelligent receipt scanning and analysis system 100 may be machine readable instructions stored on a non-transitory computer readable medium. In addition, or alternatively, the elements of the intelligent receipt scanning and analysis system 100 may be hardware or a combination of machine readable instructions and hardware.

With respect to the receipt scanner 102 that is to scan the receipt 104, according to an example, the receipt scanner 102 may include a mobile phone. Alternatively, the receipt scanner 102 may include any type of mobile device that may be used to scan the receipt 104. The receipt scanner 102 may scan the receipt 104 by generating, for example, a single snapshot, a video snapshot, and/or a plurality of snapshots of the receipt 104 at a specified (predetermined or predeterminable) constant rate. For example, the receipt scanner 102 may use an application that is pre-installed or downloaded to perform the scanning of the receipt 104. The plurality of snapshots of the receipt 104 may provide for improvement in acquisition quality based on a higher pixel density compared to a single snapshot, and higher resolution compared to a video snapshot.

With respect to the scan transformer 110 that is to transform the information 106 related to the product 108 from the scanned receipt 104 to text 112, the scan transformer 110 may combine the plurality of snapshots of the receipt 104 into a single snapshot of the receipt 104 to generate a snapshot. With respect to the video snapshot, the scan transformer 110 may select one or more high resolution snapshots from the video snapshot. In order to combine the plurality of snapshots of the receipt 104 into a single snapshot of the receipt 104, the scan transformer 110 may generate control points for overlapping images for each snapshot. The plurality of images may be combined using projection. For example, rectilinear projection may be used to combine the plurality of images by preserving straight lines. With respect to rectilinear projection, the rotation of the receipt scanner 102 (i.e., the camera for the receipt scanner 102) may be maintained at <90°.

The scan transformer 110 may process the image of the receipt 104 captured by the receipt scanner 102 in a pre-processing step by recognizing a shape of the receipt 104. In this regard, once the location of the receipt 104 is detected, the image of the receipt 104 may be processed, for example, by using a Canny edge detector. The contours of the receipt 104 may be detected, for example, by using approximation. For example, the approximation may be performed by using the Teh-Chin Chain process. With respect to pre-processing of the receipt 104, the largest rectangular component based on the shape of the receipt 104 may be designated as the receipt 104.

The scan transformer 110 may realign (e.g., by rotation) the orientation of the receipt 104 to a specified (predetermined or predeterminable) orientation in order to correct any skew in the orientation of the receipt 104. With respect to the receipt orientation, in order to prepare for optical character recognition (OCR) by the scan transformer 110, any misorientation of the receipt 104 may be corrected. For example, the scan transformer 110 may apply area mapping to correct the alignment of the receipt 104.

The scan transformer 110 may crop the image of the receipt 104 to eliminate, for example, any edge details of the receipt 104.

The scan transformer 110 may apply OCR to the realigned and cropped image of the receipt 104 to transform the information 106 related to the product 108 from the scanned receipt 104 to text 112. With respect to OCR, the scan transformer 110 may apply appropriate image filters to the receipt 104. The image filters may be applied to improve text recognition. For example, the scan transformer 110 may apply image filtering techniques including noise reduction, stroke width normalization, and/or contrast stretching (normalization) to improve text recognition. The contrast stretching may be applied in conjunction with Histogram equalization and fast gray-level grouping to improve text recognition.

With respect to OCR, the scan transformer 110 may perform color to monochrome conversion to transform the information 106 related to the product 108 from the scanned receipt 104 to text 112. The color may be coded using red, green, and blue (RGB) scale. With respect to color to monochrome conversion, the image of the receipt 104 may be transformed from any color source into a black and white version. Black-and-white may be coded using, for example, one-bit per pixel. The color to black-and-white conversion may be performed by using, for example, binarization techniques. Examples of the binarization include k-means, Otsu, Histogram peaks, and Kohonen self-oriented map.

Figure 2A:
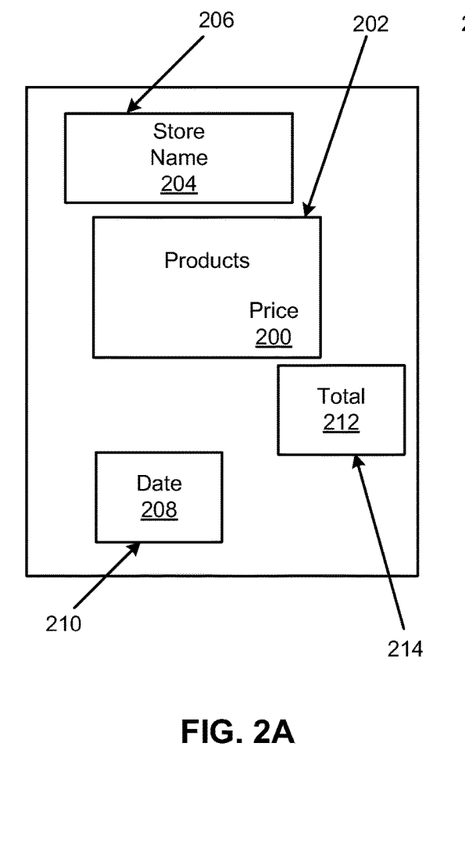
FIGS. 2A and 2B illustrate receipt patterns, according to an example of the present disclosure.
Figure 2B:
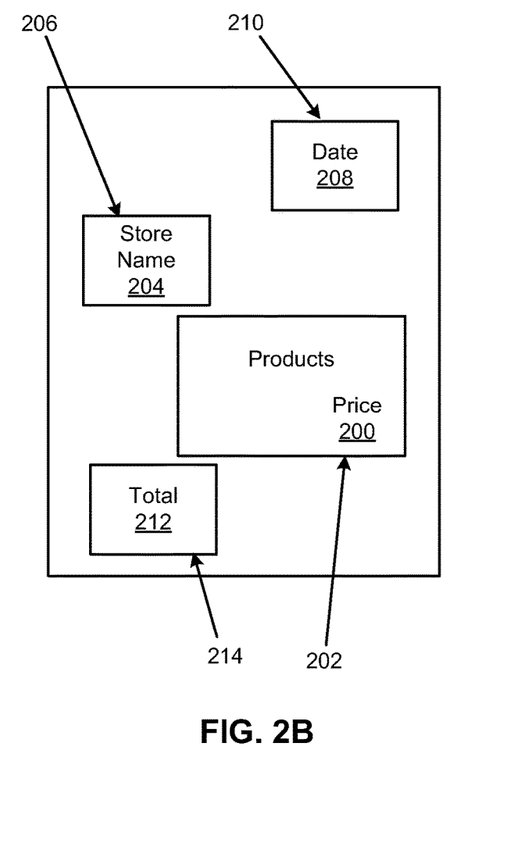

With respect to the information extractor 114 that is to extract the information 106 related to the product 108 from the text 112, the information extractor 114 may utilize the machine learning process to estimate a pattern for the receipt 104. FIGS. 2A and 2B illustrate receipt patterns, according to an example of the present disclosure. As shown in FIGS. 2A and 2B, the patterns for the receipt 104 may be based on a location of a price 200 in a products zone 202 of the receipt 104, a seller name (e.g., store name) 204 in a seller zone 206 of the receipt 104, a date 208 in a date zone 210 of the receipt 104, and/or a numerical amount 212 in an amount total zone 214 of the receipt 104. The seller name 204 in the seller zone 206 of the receipt 104 may also include a seller address and/or other seller information. With respect to the analysis of the receipt 104, the receipt 104 may similarly include details related to the purchaser of the product 108. The information extractor 114 may obtain location related information for the purchaser of the product 108 by information from Global Positioning System (GPS), WiFi location, cell tower location, etc., related to the receipt scanner 102.

Figure 3A:
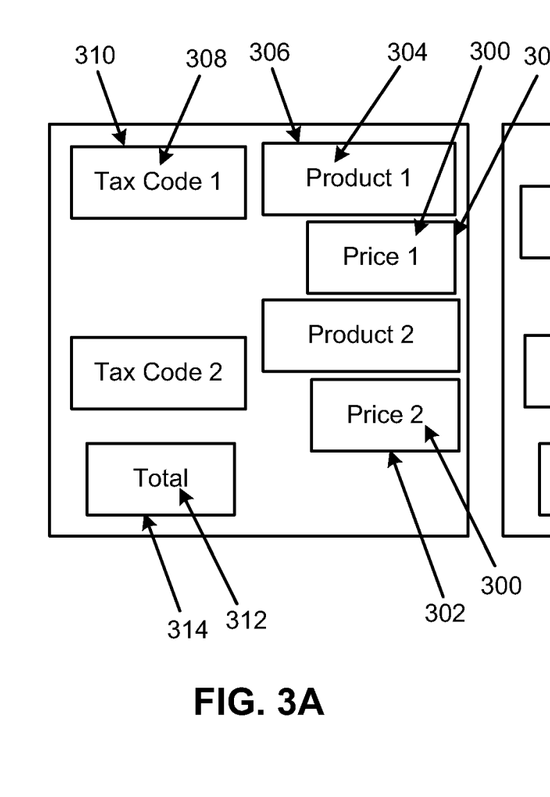
FIGS. 3A-3C illustrate product line patterns, according to an example of the present disclosure.
Figure 3B:
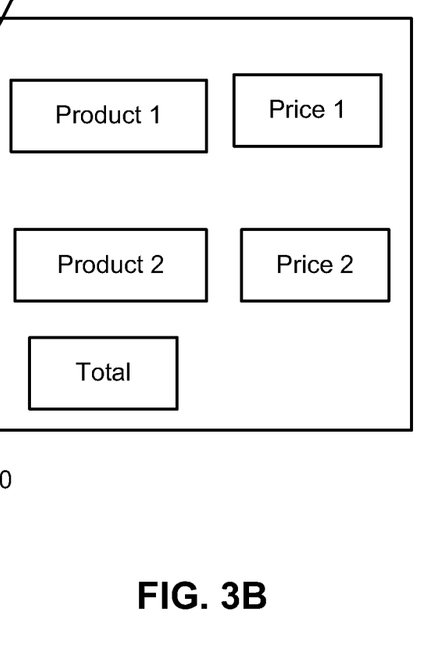
Figure 3C:
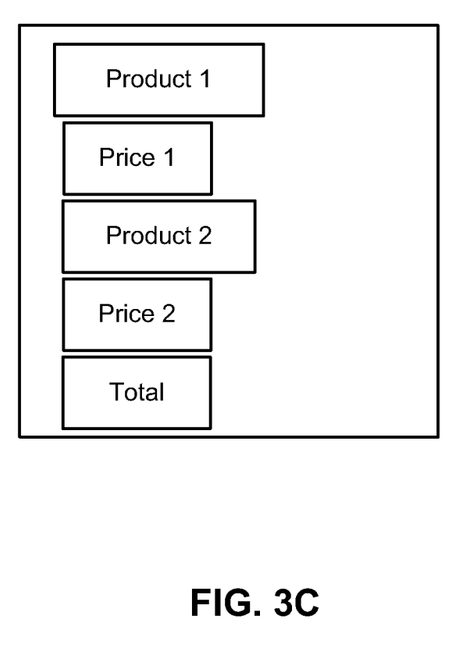

The information extractor 114 may also utilize the machine learning process to estimate a pattern for a product line related to the product 108. FIGS. 3A-3C illustrate product line patterns, according to an example of the present disclosure. For example, the pattern for the product line related to the product 108 may be based on a location of a price 300 (e.g., price 1 and price 2) in a price zone 302 (e.g., price zone for price 1 and price 2) of the receipt 104, text 304 (e.g., product 1 and product 2) in a product zone 306, various tax codes 308 (e.g., tax code 1 and tax code 2) in tax code zones 310, and/or a numerical amount 312 in an amount total zone 314 of the receipt 104 that matches a total of all prices in the price zone 302 of the receipt 104. The pattern for the product line related to the product 108 may include other information, such as, for example, reference to a location and/or seller of the product 108.

With respect to the information extractor 114, the extracted information 106 related to the product 108 may include, for example, a purchase location of the product 108, a description of the product 108, and/or a price of the product 108.

With respect to the product matcher 116 that is to compare the extracted information 106 related to the product 108 to known information 118 for a plurality of known products 120 to identify the product 108 as a known product 122 of the plurality of known products 120 or an unknown product 124, according to an example, the product matcher 116 may compare the extracted information 106 related to the product 108 to known information 118 for a plurality of known products 120 by comparing a description of the product 108 with product labels of the plurality of known products 120. The product labels of the plurality of known products 120 may be stored in the product database 130, for example, as the known information 118. The product database 130 may include, for example, an open-source product list. Alternatively or additionally, the product database 130 may include, for example, a catalog product list provided by a seller of products.

According to an example, in response to a determination that the description of the product 108 matches a product label of the product labels of the plurality of known products 120, the product matcher 116 may identify the product 108 as the known product of the plurality of known products 120.

According to an example, in response to a determination that the description of the product matches a plurality of the product labels of the plurality of known products 120, the product matcher 116 may analyze seller information related to a seller of the product 108 and/or price information related to a price of the product 108. For the product matcher 116, analyzing price information related to a price of the product 108 may further include comparing the price of the product 108 to average prices of known products related to the plurality of the product labels of the plurality of known products 120, and identifying the product 108 as one of the known products related to the plurality of the product labels of the plurality of known products 120 for which the price of the product 108 is closest to an average price of the one of the known products. According to an example, instead of the average price, the price of the product 108 may be compared to a maximum, minimum, and/or median price of the one of the known products.

According to an example, for the product matcher 116, analyzing information related to a price of the product 108 may further include comparing the price of the product 108 to average prices of known products related to the plurality of the product labels of the plurality of known products 120, and identifying the product 108 as one of the known products related to the plurality of the product labels of the plurality of known products 120 for which the price of the product is within a specified (predetermined or predeterminable) high price threshold and a specified (predetermined or predeterminable) low price threshold compared to an average price of the one of the known products. For example, the specified high price threshold and the specified low price threshold may be specified as ±x % of the average price of the one of the known products. According to an example, instead of the average price, the price of the product 108 may be compared to a maximum, minimum, and/or median price of the one of the known products.

According to an example, the product matcher 116 may compare the extracted information 106 related to the product 108 to known information for a plurality of known products 120 to identify the product 108 as a known product of the plurality of known products 120 or an unknown product by comparing a description of the product 108 with product labels of the plurality of known products 120.

According to an example, the product matcher 116 may search for a product label (e.g., XYZ White Rice) of the product labels of the plurality of known products 120 that is closest (i.e., has the shortest distance) to the a product label (e.g., XYZ Wh. Rice) for the product 108 scanned by the receipt scanner 102. Various techniques may be used by the product matcher 116 to determine a distance between a product label in the product database 130 and the scanned product label for the product 108. For example, Jaro-Winkler and/or Levenshtein distance techniques may be used by the product matcher 116 to determine a distance between a product label in the product database 130 and the scanned product label for the product 108. With respect to the Levenshtein distance, the Levenshtein distance between two strings a, b may be determined as follows:

$$lev_{a,b}(i, j) = \begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{otherwise.} \end{cases} \quad \text{Equation (1)}$$

For Equation (1), $1_{(a_i \neq b_j)}$ is the indicator function equal to 0 when $a_i = b_j$, and equal to 1 otherwise.

According to an example, the product matcher 116 may utilize the distance between a product label in the product database 130 and the scanned product label for the product 108, and further evaluate the scanned price for the product 108 against the average price for the product 108 in the product database 130. For example, in response to a determination that the description of the product is within a specified (predetermined or predeterminable) distance to a product label of the product labels of the plurality of known products 120, and a price of the product is within a specified (predetermined or predeterminable) high price threshold and a specified (predetermined or predeterminable) low price threshold compared to an average price of one of the known products, the product matcher 116 may identify the product 108 as the one of the known products.

According to an example, the product matcher 116 may compare the extracted information 106 related to the product 108 to known information for a plurality of known products 120 to identify the product 108 as a known product of the plurality of known products 120 or an unknown product by generating a probability of the identification of the product 108 as the one of the known products. In response to a determination that the probability of the identification of the product 108 as the one of the known products is greater than a specified (predetermined or predeterminable) probability threshold (e.g., 90%), the product matcher 116 may identify the product 108 as the one of the known products.

Based on the identification of the product 108 as the one of the known products, any additional and/or different information 106 that is extracted by the information extractor 114 may be stored in the product database 130. Such information 106 may include, for example, seller information, a product label, price information, customer information, etc. Further, with respect to unknown products, any information 106 that is extracted by the information extractor 114 may be stored in the product database 130.

If there is no match of the information 106 for the product 108 to the known information 118, a purchaser of the product 108 may be requested to manually match the product 108 to one of the known products 120. For example, the purchaser of the product 108 may be provided with suggested products (e.g., products with the lowest label distance) to manually match the product 108 to one of the known products 120. In the event that no suggestions are available, the purchaser of the product 108 may be requested to provide details with respect to the product 108. For example, the purchaser of the product 108 may be requested to provide a description, brand details, and/or photos of the product 108.

With respect to the product analyzer 126 that is to analyze the extracted information 106 related to the product 108 and known product information 128, the product analyzer 126 may assign a score to each of the plurality of known products 120 for each associated seller, generate sums of all scores for each seller of each of the plurality of known products 120, and identify a seller of the sellers of each of the plurality of known products 120 that has a lowest score of all scores for each seller of each of the plurality of known products 120. For example, the product analyzer 126 may assign a score of 0 as the median price for the product 108, 1 as the maximum, and −1 as the minimum to each of the plurality of known products 120 for each associated seller.

According to an example, the product analyzer 126 may sort a price list in the product database 130 for a particular product of the known products 120 to locate a seller of the product 108 that has been recorded with a lowest price for the product 108.

According to an example, the product analyzer 126 may analyze the extracted information 106 related to the product 108 and known product information for the known product of the plurality of known products by comparing a price for the product 108 to prices of the product 108 for a plurality of sellers of the product 108, determining differences between the price of the product 108 and the prices of the product 108 for each of the plurality of sellers of the product 108, and identifying a seller of the product 108 from the plurality of sellers of the product 108 that has a maximum price difference between the price of the product 108 and the prices of the product 108 for each of the plurality of sellers of the product 108. In this manner, the product analyzer 126 may identify the seller of the product 108 that has the lowest price for the product 108, compared to the purchase price for the product 108.

With respect to the report generator 132 that is to generate a report 134 based on the analysis of the extracted information 106 related to the product 108 and the known product information 128 for the known product 122 of the plurality of known products 120, the report 134 may include, for example, identification of purchasers of the product 108, identification of potential purchasers of the product 108, and/or identification of a lowest price of the product 108.

The report 134 may thus provide for market price tracking based on the identification of the lowest price of the product 108. For example, the market price tracking may use the known information 118 (e.g., seller information, price, date of the scan for a product) to determine price of the product 108 related to geography, seller, and/or seasonality.

The report 134 may also provide for information related to buying habits of customers of a seller.

The report 134 may provide for identification of a price difference between a price that is paid for the product 108 versus a lower price availability for the product 108.

The report 134 may also provide information related to habits of purchasers of the product 108 (e.g., where the product 108 is being purchased, by what types of customers, etc.). For example, the purchaser buying habits may use the known information 118 (e.g., seller information, price, date of purchase, product details, purchaser of the product) to determine frequency of visits to a seller by a purchaser, frequency of product purchase, which products are purchased or not, and whether purchasers go to multiple sellers for a product.

With respect to identification of potential purchasers of the product 108, the report 134 may provide for identification of potential purchasers of the product 108 based, for example, on habits of current purchasers of the product 108.

The report 134 may be used for marketing purposes. For example, a seller may claim being the lowest price seller by providing data to the purchasers. For example, a seller may list a product price and comparison prices with competitors. A seller may display prices for a product for another seller on a price tag. Additional receipts may be provided to a purchaser as to product cost at different sellers.

The report 134 may also provide for analytics related to competitor pricing of a product. For example, the report 134 may provide for estimation of market share for the product 108 (e.g., by analyzing the number of products scanned), price positioning of each product, and/or an impact of the product price on sales.

Figure 4:
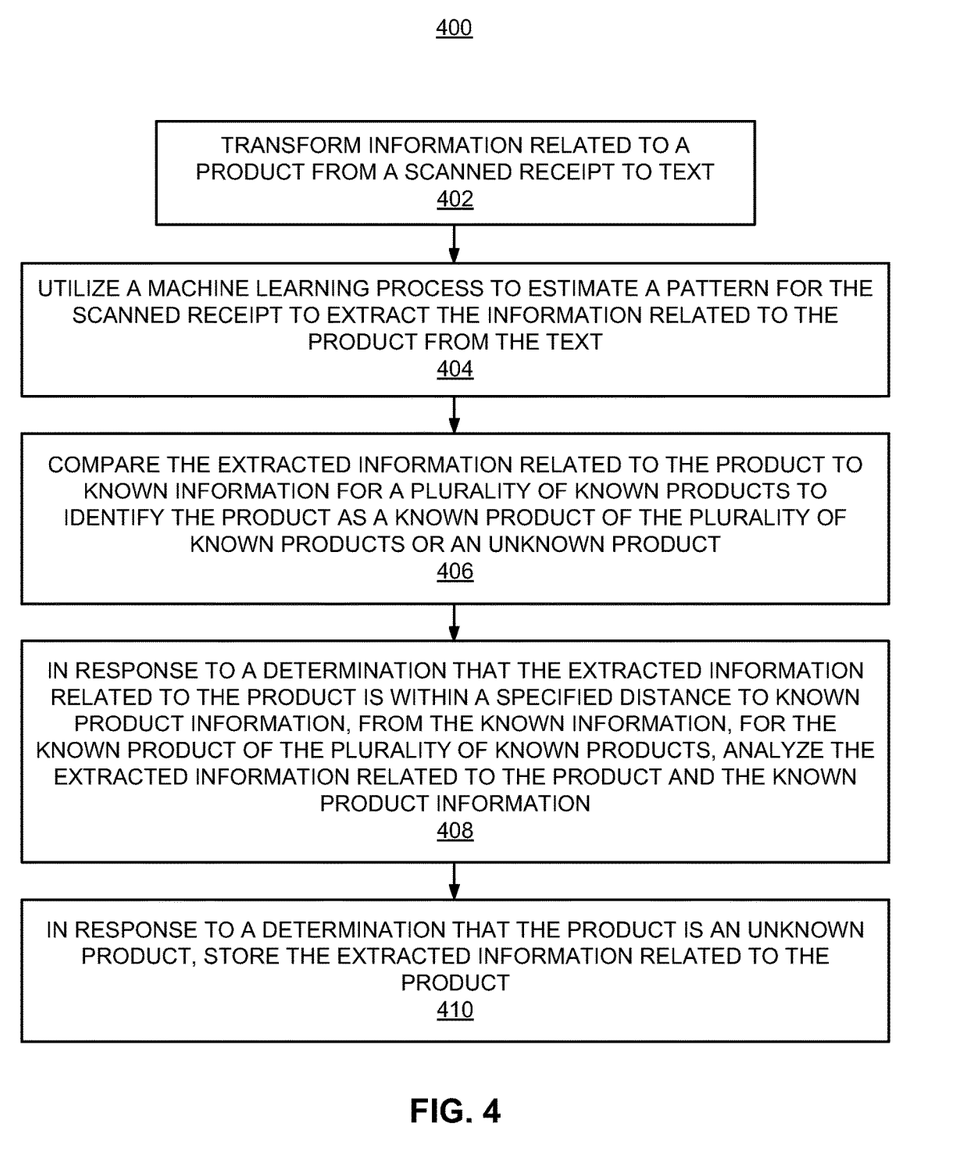
FIG. 4 illustrates a method for intelligent receipt scanning and analysis, according to an example of the present disclosure.
Figure 5:
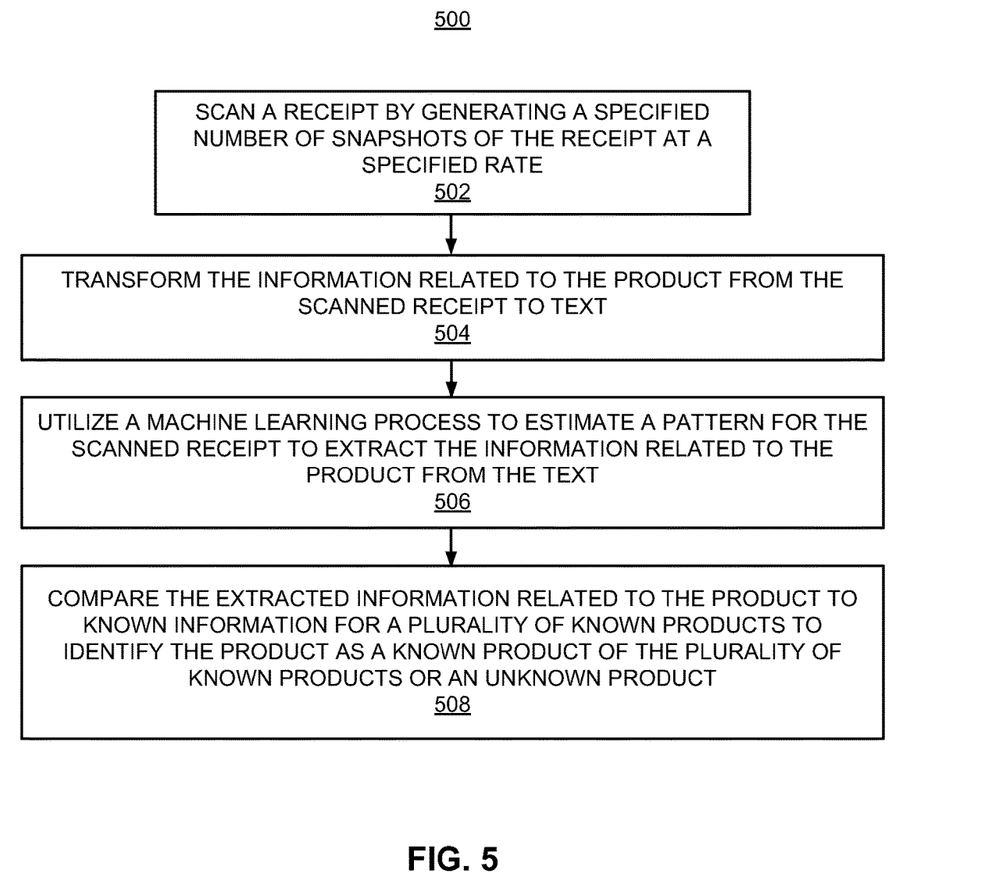
FIG. 5 illustrates further details of the method for intelligent receipt scanning and analysis, according to an example of the present disclosure.

FIGS. 4 and 5 illustrate flowcharts of methods 400 and 500 for intelligent receipt scanning and analysis, according to examples. The methods 400 and 500 may be implemented on the intelligent receipt scanning and analysis system 100 described above with reference to FIGS. 1-3 by way of example and not limitation. The methods 400 and 500 may be practiced in other systems.

Referring to FIGS. 1 and 4, at block 402, the method 400 may include transforming information related to a product from a scanned receipt to text. For example, referring to FIG. 1, the scan transformer 110 may transform the information 106 related to the product 108 from the scanned receipt 104 to text 112.

At block 404, the method 400 may include utilizing a machine learning process to estimate a pattern for the scanned receipt to extract the information related to the product from the text. For example, referring to FIG. 1, the information extractor 114 may utilize a machine learning process to estimate a pattern for the scanned receipt 104 to extract the information 106 related to the product 108 from the text 112.

At block 406, the method 400 may include comparing the extracted information related to the product to known information for a plurality of known products to identify the product as a known product of the plurality of known products or an unknown product. For example, referring to FIG. 1, the product matcher 116 may compare the extracted information 106 related to the product 108 to known information 118 for a plurality of known products 120 to identify the product 108 as a known product 122 of the plurality of known products 120 or an unknown product 124.

In response to a determination that the extracted information related to the product is within a specified (predetermined or predeterminable) distance to known product information, from the known information, for the known product of the plurality of known products, at block 408, the method 400 may include analyzing the extracted information related to the product and the known product information, and generating a report based on the analysis of the extracted information related to the product and the known product information for the known product of the plurality of known products. For example, referring to FIG. 1, the product analyzer 126 may analyze the extracted information 106 related to the product 108 and known product information 128, from the known information 118, for the known product 122 of the plurality of known products 120 in response to a determination that the extracted information 106 related to the product 108 is within a specified (predetermined or predeterminable) distance to the known product information 128 for the known product 122 of the plurality of known products 120.

In response to a determination that the product is an unknown product, at block 410, the method 400 may include storing the extracted information related to the product. For example, referring to FIG. 1, the product analyzer 126 may store (e.g., using the product database 130) the extracted information 106 related to the product 108 in response to a determination that the product 108 is an unknown product 124.

Referring to FIGS. 1 and 5, at block 502, the method 500 may include scanning a receipt by generating a specified (predetermined or predeterminable) number of snapshots of the receipt at a specified (predetermined or predeterminable) rate. For example, referring to FIG. 1, the receipt scanner 102 may scan the receipt 104 by generating a specified (predetermined or predeterminable) number of snapshots of the receipt 104 at a specified (predetermined or predeterminable) rate.

At block 504, the method 500 may include transforming the information related to the product from the scanned receipt to text. For example, referring to FIG. 1, the scan transformer 110 may transform the information 106 related to the product 108 from the scanned receipt 104 to text 112.

At block 506, the method 500 may include utilizing a machine learning process to estimate a pattern for the scanned receipt to extract the information related to the product from the text. According to an example, the extracted information related to the product may include a purchase location of the product, a description of the product, and/or a price of the product. For example, referring to FIG. 1, the information extractor 114 may utilize a machine learning process to estimate a pattern for the scanned receipt 104 to extract the information 106 related to the product 108 from the text 112.

At block 508, the method 500 may include comparing the extracted information related to the product to known information for a plurality of known products to identify the product as a known product of the plurality of known products or an unknown product. For example, referring to FIG. 1, the product matcher 116 may compare the extracted information 106 related to the product 108 to known information 118 for a plurality of known products 120 to identify the product 108 as a known product 122 of the plurality of known products 120 or an unknown product 124. According to an example, the comparison may include comparing a description of the product 108 with product labels of the plurality of known products. In response to a determination that the description of the product 108 matches a product label of the product labels of the plurality of known products 120, the product 108 may be identified as the known product of the plurality of known products. Further, in response to a determination that the description of the product 108 matches a plurality of the product labels of the plurality of known products 120, seller information related to a seller of the product 108 and/or price information related to a price of the product 108 may be analyzed to identify the product 108.

Figure 6:
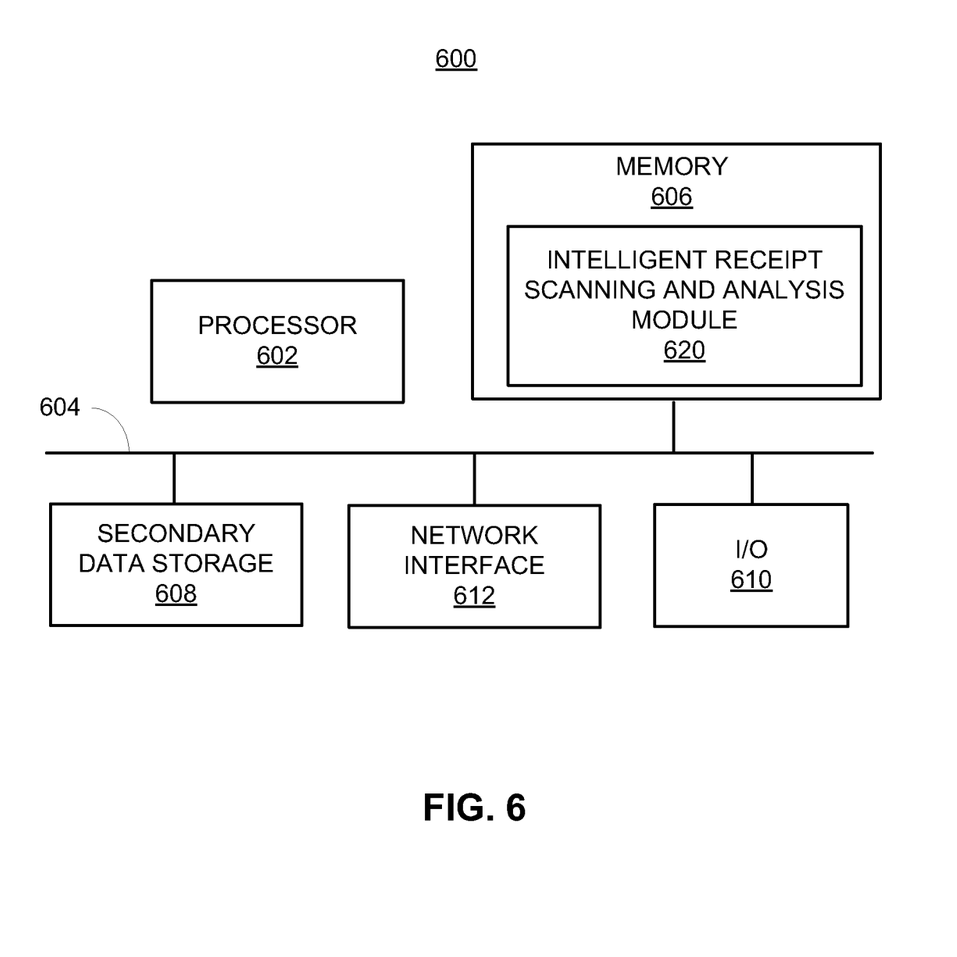
FIG. 6 illustrates a computer system, according to an example of the present disclosure.

FIG. 6 shows a computer system 600 that may be used with the examples described herein. The computer system may represent a generic platform that includes components that may be in a server or another computer system. The computer system 600 may be used as a platform for the system 100. The computer system 600 may execute, by a processor (e.g., a single or multiple processors) or other hardware processing circuit, the methods, functions and other processes described herein. These methods, functions and other processes may be embodied as machine readable instructions as a part of a computer program product, particularly by being stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer program product may also be embodied as a signal and/or data stream.

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include an intelligent receipt scanning and analysis module 620 including machine readable instructions residing in the memory 606 during runtime and executed by the processor 602. The intelligent receipt scanning and analysis module 620 may include the elements of the system 100 shown in FIG. 1.

The computer system 600 may include an I/O device 610, such as a keyboard, a mouse, a display, etc. The computer system may include a network interface 612 for connecting to a network. Other known electronic components may be added or substituted in the computer system.

Accordingly, there is disclosed intelligent receipt scanning and analysis which may include scanning a receipt that includes information related to a product. The information related to the product may be transformed to text, and extracted from the text by utilizing a machine learning process. The extracted information may be compared to known information for a plurality of known products to identify the product as a known product of the plurality of known products or an unknown product. The extracted information related to the product and known product information, from the known information, for the known product of the plurality of known products may be analyzed in response to a determination that the extracted information is similar to the known product information for the known product of the plurality of known products. Further, the extracted information related to the product may be stored in response to a determination that the product is an unknown product.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An intelligent receipt scanning and analysis system which increases comprehension accuracy of a scanned receipt, comprising:
   at least one processor;
   an electronic receipt scanner, executed by the at least one processor, to scan a receipt, wherein the receipt includes information related to a product;
   a scan transformer, executed by the at least one processor, to transform the information related to the product from the scanned receipt to text;
   an information extractor, executed by the at least one processor, to utilize a machine learning process to extract the information related to the product from the text;
   a product matcher, executed by the at least one processor, to compare the extracted information related to the product to known information for a plurality of known products to identify the product as a known product of the plurality of known products or an unknown product by:
      comparing a description of the product with product labels of the plurality of known products; and
      in response to a determination that
         the description of the product is within a specified distance to a product label of the product labels of the plurality of known products, and
         a price of the product is within a specified high price threshold and a specified low price threshold compared to a price of one of the plurality of known products.
      identifying the product as one of the plurality of known products; and
   a product analyzer, executed by the at least one processor, to analyze the extracted information related to the product and known product information, from the known information, for the known product of the plurality of known products in response to a determination that the extracted information related to the product is similar to the known product information for the known product of the plurality of known products.

2. The intelligent receipt scanning and analysis system according to claim 1, further comprising:
   a report generator, executed by the at least one processor, to generate a report based on the analysis of the extracted information related to the product and the known product information for the known product of the plurality of known products, wherein the report includes identification of purchasers of the product.

3. The intelligent receipt scanning and analysis system according to claim 1, further comprising:
   a report generator, executed by the at least one processor, to generate a report based on the analysis of the extracted information related to the product and the known product information for the known product of the plurality of known products, wherein the report includes identification of potential purchasers of the product.

4. The intelligent receipt scanning and analysis system according to claim 1, further comprising:
a report generator, executed by the at least one processor, to generate a report based on the analysis of the extracted information related to the product and the known product information for the known product of the plurality of known products, wherein the report includes identification of a lowest price of the product.

5. The intelligent receipt scanning and analysis system according to claim 1, wherein the receipt scanner includes a mobile phone.

6. The intelligent receipt scanning and analysis system according to claim 1, wherein the extracted information related to the product includes at least one of
a purchase location of the product,
the description of the product, or
the price of the product.

7. The intelligent receipt scanning and analysis system according to claim 1, wherein the receipt scanner is to scan the receipt by generating a plurality of snapshots of the receipt at a specified constant rate.

8. The intelligent receipt scanning and analysis system according to claim 1, wherein the information extractor is to utilize the machine learning process to estimate a pattern for the receipt.

9. The intelligent receipt scanning and analysis system according to claim 8, wherein the pattern is based on a location of at least one of
a price in a products zone of the receipt,
a seller name in a seller zone of the receipt,
a date in a date zone of the receipt, or
a numerical amount in an amount total zone of the receipt.

10. The intelligent receipt scanning and analysis system according to claim 1, wherein the information extractor is to utilize the machine learning process to estimate a pattern for a product line related to the product.

11. The intelligent receipt scanning and analysis system according to claim 10, wherein the pattern is based on a location of at least one of
a price in a price zone of the receipt, or
a numerical amount in an amount total zone of the receipt that matches a total of all prices in the price zone of the receipt.

12. The intelligent receipt scanning and analysis system according to claim 1, wherein the product matcher is to compare the extracted information related to the product to known information for a plurality of known products by:
comparing the description of the product with the product labels of the plurality of known products;
in response to a determination that the description of the product matches the product label of the product labels of the plurality of known products, identifying the product as the known product of the plurality of known products; and
in response to a determination that the description of the product matches a plurality of the product labels of the plurality of known products, analyzing at least one of seller information related to a seller of the product or price information related to the price of the product.

13. The intelligent receipt scanning and analysis system according to claim 12, wherein analyzing price information related to the price of the product further comprises:
comparing the price of the product to prices of known products related to the plurality of the product labels of the plurality of known products; and
identifying the product as the one of the known products related to the plurality of the product labels of the plurality of known products for which the price of the product is closest to a price of the one of the known products.

14. The intelligent receipt scanning and analysis system according to claim 12, wherein analyzing price information related to the price of the product further comprises:
comparing the price of the product to prices of known products related to the plurality of the product labels of the plurality of known products; and
identifying the product as the one of the known products related to the plurality of the product labels of the plurality of known products for which the price of the product is within the specified high price threshold and the specified low price threshold compared to the price of the one of the known products.

15. The intelligent receipt scanning and analysis system according to claim 1, wherein the product matcher is to compare the extracted information related to the product to known information for a plurality of known products to identify the product as a known product of the plurality of known products or an unknown product by:
generating a probability of the identification of the product as the one of the known products; and
in response to a determination that the probability of the identification of the product as the one of the known products is greater than a specified probability threshold, identifying the product as the one of the known products.

16. The intelligent receipt scanning and analysis system according to claim 1, wherein the product analyzer is to analyze the extracted information related to the product and known product information for the known product of the plurality of known products by:
assigning a score to each of the plurality of known products for each associated seller;
generating sums of all scores for each seller of each of the plurality of known products; and
identifying a seller of the sellers of each of the plurality of known products that has a lowest score of all scores for each seller of each of the plurality of known products.

17. The intelligent receipt scanning and analysis system according to claim 1, wherein the product analyzer is to analyze the extracted information related to the product and known product information for the known product of the plurality of known products by:
comparing the price for the product to prices of the product for a plurality of sellers of the product;
determining differences between the price of the product and the prices of the product for each of the plurality of sellers of the product; and
identifying a seller of the product from the plurality of sellers of the product that has a maximum price difference between the price of the product and the prices of the product for each of the plurality of sellers of the product.

18. The intelligent receipt scanning and analysis system according to claim 1, wherein the product analyzer is to store the extracted information related to the product in response to a determination that the product is an unknown product.

19. A method for intelligent receipt scanning and analysis which increases comprehension accuracy of a scanned receipt, the method comprising:
- scanning, by an electronic receipt scanner, a receipt;
- transforming, by at least one processor, information related to a product from the scanned receipt to text;
- utilizing a machine learning process to estimate a pattern for the scanned receipt to extract the information related to the product from the text;
- comparing the extracted information related to the product to known information for a plurality of known products to identify the product as a known product of the plurality of known products or an unknown product by:
  - comparing a description of the product with product labels of the plurality of known products; and
  - in response to a determination that
    - the description of the product is within a specified distance to a product label of the product labels of the plurality of known products, and
    - a price of the product is within a specified high price threshold and a specified low price threshold compared to a price of one of the plurality of known products,
  - identifying the product as one of the plurality of known products; and
- in response to a determination that the extracted information related to the product is within a specified distance to known product information, from the known information, for the known product of the plurality of known products, analyzing the extracted information related to the product and the known product information, and generating a report based on the analysis of the extracted information related to the product and the known product information for the known product of the plurality of known products; and
- in response to a determination that the product is an unknown product, storing the extracted information related to the product.

20. A non-transitory computer readable medium having stored thereon machine readable instructions for intelligent receipt scanning and analysis which increases comprehension accuracy of a scanned receipt, the machine readable instructions when executed cause a processor to:
- scan a receipt by generating a specified number of snapshots of the receipt at a specified rate, wherein the receipt includes information related to a product;
- transform the information related to the product from the scanned receipt to text;
- utilize a machine learning process to estimate a pattern for the scanned receipt to extract the information related to the product from the text, wherein the extracted information related to the product includes at least one of a purchase location of the product, a description of the product, and a price of the product; and
- compare the extracted information related to the product to known information for a plurality of known products to identify the product as a known product of the plurality of known products or an unknown product, wherein the comparison includes
  - comparing the description of the product with product labels of the plurality of known products,
  - in response to a determination that
    - the description of the product is within a specified distance to a product label of the product labels of the plurality of known products, and
    - the price of the product is within a specified high price threshold and a specified low price threshold compared to a price of one of the plurality of known products, identifying the product as the known product of the plurality of known products, and
  - in response to a determination that the extracted information related to the product is within a specified distance to known product information, from the known information, for the known product of the plurality of known products, analyzing at least one of seller information related to a seller of the product or price information related to a price of the product to identify the product.

* * * * *

UNITED STATES PATENT AND TRADEMARK OFFICE
CERTIFICATE OF CORRECTION

PATENT NO. : 9,865,012 B2
APPLICATION NO. : 14/634299
DATED : January 9, 2018
INVENTOR(S) : Richard Vidal et al.

Page 1 of 1

It is certified that error appears in the above-identified patent and that said Letters Patent is hereby corrected as shown below:

On the Title Page

At Item (30), Foreign Application Priority Data "14306305" should be "14306305.5".

Signed and Sealed this
First Day of May, 2018

Andrei Iancu
*Director of the United States Patent and Trademark Office*